Patented Oct. 31, 1922.

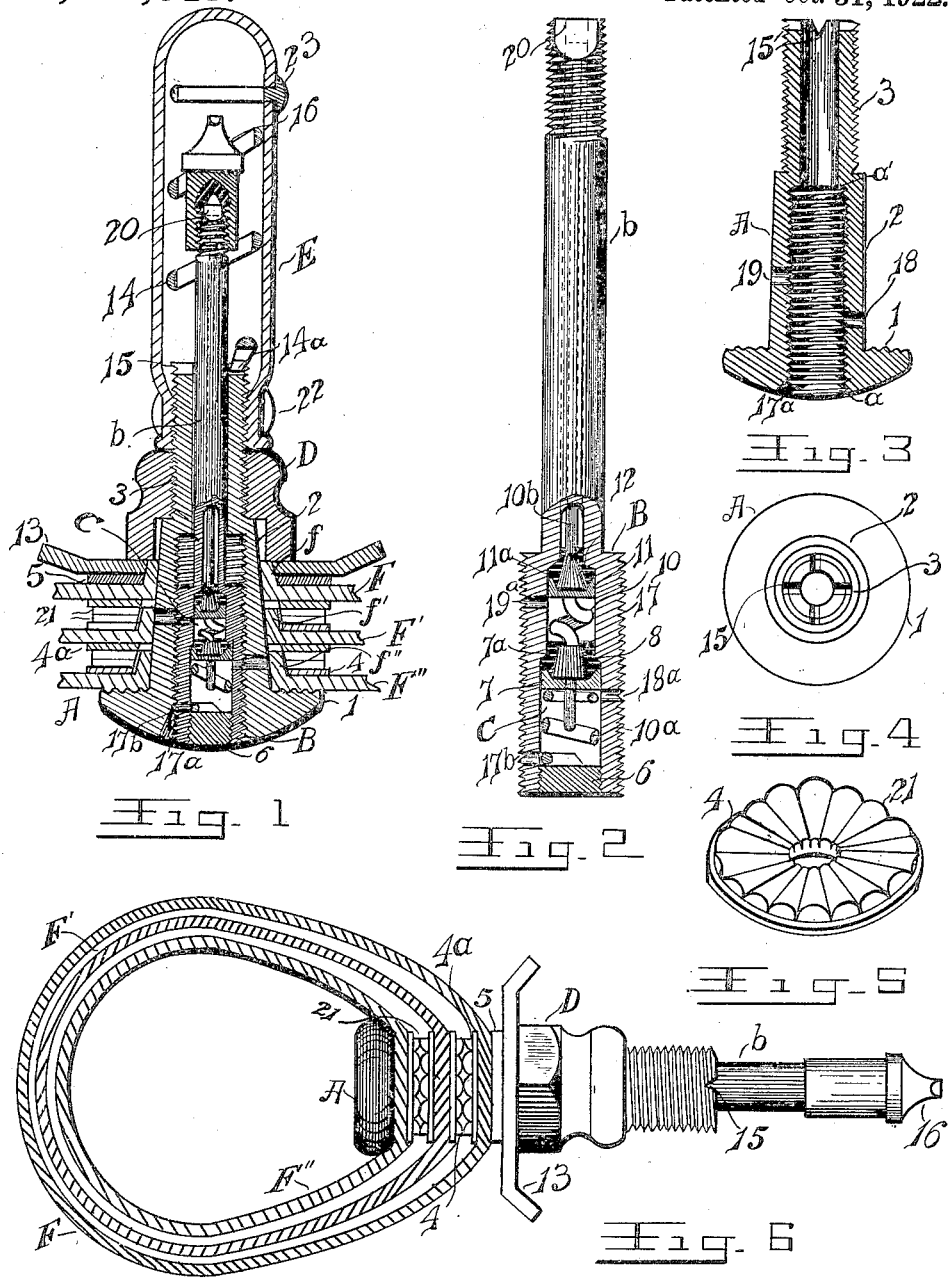

1,433,643

UNITED STATES PATENT OFFICE.

JACOB ALPHEUS OVERLANDER, OF NEW YORK, N. Y.

MULTIPLE TIRE VALVE FOR VEHICLES.

Application filed June 13, 1916. Serial No. 103,595.

*To all whom it may concern:*

Be it known that I, JACOB ALPHEUS OVERLANDER, a citizen of the United States, residing in the city, county, and State of New York, have invented certain new and useful Improvements in Multiple Tire Valves for Vehicles, set forth in the following claims, specification, and the drawings accompanying the same, reference thereto being for greater particularity.

The invention relates to improvements in inner tubes for vehicle tires having suitable valves for communication with either or any of said tubes whereby compressed air is admitted simultaneously or alternately in the manner and for the purposes hereinafter to be described.

Among the objects of the invention are the prevention of and consequent delays by punctures, leaks, blow-outs and many other accidents of kindred nature and like character; to facilitate repairing or renewing of shoes or tires on that account and to serve with equal effect in emergencies or ordinary use.

A further object is to provide a suitable stop valve so designed as to effect, by manipulation, the purposes and objects of the invention in the use of any number of inner tubes in order that the tubes may be inflated simultaneously, thus equalizing the pressure within the respective interspaces more perfectly against thermal changes, or alternately with double security against emergencies arising through accidents or constant wear.

The novel features of the invention will be more fully and at large set out in the forthcoming detailed description to be read in connection with the drawings and the claims.

In the drawings, Figure 1 is a vertical cross-section through the multiple inner tubes, the hollow valve body, the adjustable three way stop valve and the check valve proper; Figure 2 is a vertical sectional view of the adjustable stop valve and the check valve enlarged; Figure 3 is a sectional view of the valve body A; Figure 4 is a plan view of the valve body A, showing the flange 1, its conical portion 2, the threaded portion 3 and the rack 15; Figure 5 is a perspective view of the convoluted washer, and Figure 6 is a side elevation of the assembled valve showing F, F' and F'' in cross-section clamped in position.

The invention consists in the arrangement of any number of inner vehicle tires or tubes, one inside of the other. For illustration I represent the tubes F, F' F'' with a three way stop valve attached to each of said tubes in the manner to be described for admitting and retaining compressed air in the interspaces therebetween.

The tubes F, F' and F'' are made of rubber tubing in the usual manner being of ring-like formation both in side view and in cross-section; that is to say, I take some rubber tubing cylindrical in shape and of the proper size, quality, length and pliability and place the tubing F'' inside of the tubing F' and the tubing F' inside of the tubing F, strip back the ends of the tubing F and F', vulcanize or cement, as preferred, the ends of the inner tubing F'' and by so doing form a continuous cylindrical tube free from any openings or vents, except for the valve, as will appear; in like manner F and F' each are made. Any suitable material may be placed inside the tubes to prevent adhesion.

The repair of these tubes is accomplished as to F in the like case with any similar tubing; as to F' and F'', through the opening on the removal of the valve by shifting the tubing around to the point where the repair is to be made, readjusting as before and replacing the valve. By this means any portion of the tubes F' and F'' may be repaired as skilfully as is possible under any circumstances.

The valve comprises the hollow valve body A with the flange 1, its conical portion 2 and the threaded portion 3, and the transverse lateral ports $17^a$, 18 and 19 an adjustable three-way stop valve B, which has its cylindrical portion screw-threaded externally at 17, Fig. 2, to engage the threads of the enlarged chamber $a$ of the valve body, and internally to engage the threads of the plug 6, with a shoulder formed at its reduction to shaft $b$ which prevents complete withdrawal outward, the transverse lateral ports $17^b$, $18^a$, and $19^a$, to coact with ports through A; and a check valve C housed in the enlarged portion of B, Fig. 1, comprising the valve stem $10^b$, two valve bearing members spaced apart by a helical valve rod 10 and a spiral spring $10^a$ limited by the plug 6 but admitting of free expansion to hold the valves against their seats. The transverse passage ways through the walls of A, designated 17ª, 18, and 19 and through the walls of B, referred to as 17ᵇ, 18ª and 19ª Figs. 2 and 3, the former being double the size of the latter when in register with each other, connects the air-chamber of the valve proper with the interspaces between the tubes F, F' and F''.

The valve body A provides the primary clamp member for the tires with its flanged base 1, the conical portion 2 and the outer cylindrical portion screw-threaded at 3 to engage the lock nut D and the dust cap E. The periphery of 2 provides a smooth tapering surface, over which are stripped the tubes F, F' and F'', two pairs of convoluted washers 4 and 4ª, intervening in couplets, identical in structure, the washer 4 being inverted and designated 4ª, with alternate ridges in contact intermediate between radially extending grooves 21 (see Fig. 6) to form passage ways from the tire interspaces through the ports of the valve, with a roughened surface in contact with the rubber tubes F'' and F', F' and F respectively, and gripped firmly together with the lock nut D. When the tubes are properly assembled, washers 4 and 4ª, are placed between F'' and F' and a similar couplet placed between F' and F thereby separating the casings to form interspaces, as stated, (see Fig. 6). The holes through the rubber tubes for the valve are smaller than the diameter of the valve itself producing a slight annular overlap $f$, $f'$, and $f''$ along the conical portion 2 where they are clamped by the washers 4 and 4ª, referred to, the guard 13 and the lock nut D. The peripheral overlaps $f$, $f'$ and $f''$ provide automatic valves against the outlet of air through the ports of the valve.

The valve body A has threads internally at $a$ extending to the shoulder $a'$ to receive the threaded end of the stop valve B, the shaft $b$ reaching beyond the valve body A carries the cap 16 and has flattened sides 20 milled off to adapt it to the application of a wrench so that the transverse ports, 17ᵇ, 18ª and 19ª, Fig. 1, of the valve B may be adjusted in or out of alignment with the transverse ports 17ª, 18 and 19 of the valve body A, normally leading to fluid pressure interspaces between F, F' and F'' already mentioned.

The double check valve C is housed in the enlarged shell of the adjustable three way stop valve B. Seats are formed in the walls of B by twice reducing its tubular diameter against which cups 7 and 11 of the valves with flexible gaskets intervening form air tight joints. The hollow cups 7 and 11 are constructed similarly in all respects except in diameter only, the outer surfaces of which are cylindrical with countersunk portions about central projecting conical cores 8 and 12, leaving a smooth annular rim formed by the hollow of the counterbores on the one side and the vertical outer surface of the valve members, which together with the conical cores 8 and 12 extending beyond the point of junction of the reduced bore of the hollow valve stem makes a double bearing in each valve— that is, the uniform annular rim of the valve cup formed by the cylindrical surface of the valve member with the bevel of the counterbore around the conical core strikes against the tapering wall of the valve stem B, and then again at the point of contact between the conical core and the vertical surface of the hollow valve stem B at the offset, another seat is formed, so that by cooperation with the yielding gaskets 7ª and 11ª against the seats of the valve in the wall of B, the two points of contact provide double leak tight joints against the outflow of air.

The action of the conical cores 8 and 12 pushes the yielding or flexible gaskets 7ª and 11ª laterally, while the cups 7 and 11 compress the bulk of the flexible gasket vertically against the inner hollow surface of the wall B forming a double valve as stated.

The double combination of valve members is operated by lifting or depressing each combination separately by fluid pressure in excess of the counter-tension exerted by the helical valve rod 10 and the spiral spring 10ª positioned in the valve stem B as described.

The valve members are connected together by the helical valve rod 10 which serves as a take up for irregularity due to the wear of the bearings, flexible gaskets and the valve seats, all of which are held in position by aid of the spiral expansion spring 10ª, limited by the plug 6 entered in the butt of the valve stem B and the under surface of the lower valve 7. The valve rod 10ᵇ extends outward through the shaft $b$ so that air through the valve may be controlled from without.

On the admission of air through the hollow valve stem B the bearings 7 and 11 are depressed from their seats and it is immaterial in the operation of the valve whether the action of the valve be simultaneous or the action of one valve be delayed relatively as to the other. Such action can be due only to the variation in the tension of the spring 10ª and the resistance of the helical valve rod 10.

The telescopic members A and B of the valve show an air tight combination, readily adjustable, so that the transverse ports of the member B may be brought in or out of alignment with the transverse ports of the member A, providing passages leading from the air chamber of the valve stem to the interspaces between the respective tires or tubes. By manipulation all of the tubes may be inflated simultaneously, one by one, or in combinations of pairs or the valve adjusted to shut off the escape of air.

The relation and operation of the valve members in combination may now be briefly described.

While the stop valve B is adjusted as shown in Fig. 1 with its ports, 17$^b$, 18$^a$ and 19$^a$, registering with the ports 17$^a$, 18 and 19 of A, all of the tubes may be inflated simultaneously. While port 18$^a$ registers with 19 the interspace between tires F and F' only is inflated, the tubes F' and F'' being collapsed. While adjusted midway between its position as shown and full extension, tube F' is inflated through ports 17$^a$ and 18, the tubes F'' being collapsed and F reinforcing the tube so inflated. While the valve is adjusted to its lowest position, so that the port 17$^a$ registers with 17$^b$ only the tire F'' is inflated F and F' being used for reinforcement. In any position of adjustment other than simultaneous inflation the respective ports out of alignment are impervious to the inlet or outlet of air. The valve is thus shown to be adjustable to different positions with independent results. It serves not only the purpose of an admission valve but also that of a stop valve against the back flow of air through the valve.

Having thus described the novel features of the invention, what I claim is:

1. A hollow valve shell adapted to receive a cylindrical valve stem comprising an outer threaded section to engage a lock-nut, an inner conical section offset from said outer threaded section having a radially extending basal flange integral therewith, a traveling lock-nut on the outer threaded section of the valve shell for clamping pneumatic tubes for vehicle tires against the basal flange of the valve shell and a cylindrical valve stem extended through and engaging the lower section of the valve shell.

2. A valve shell comprising an outer section threaded to engage a lock-nut, a conical section serving as a clamping member for pneumatic tubes, a socket in the conical section of the valve shell screw-threaded internally to engage an adjustable valve stem, a valve stem engaging the valve shell and forming a leak tight joint therewith, lateral ports through the valve shell, lateral ports through the valve stem, said lateral ports in the valve stem and valve shell being operably aligned by the adjustment of the valve stem for inlet and outflow of air, and a lock-nut clamping pneumatic tubes on the valve shell spaced apart independently of each other to form air spaces therebetween.

3. A tubular valve body having an outer threaded section to engage a lock nut and a conical inner section with a radially extending flanged base, pneumatic tubes stripped down over said valve body, convoluted washers interposed in pairs having their ridged surfaces in contact alternating with radially extending grooves, fluid pressure spaces formed between pneumatic tubes by the convoluted washers, and a lock nut engaging the outer threaded section of the valve body rigidly clamping together the pneumatic tubes, convoluted washers and valve shell.

4. A tubular valve shell having a conical inner section with a flanged base, a tubular valve stem entered therein forming an air tight joint therewith, a compound check valve secured therein to control fluid pressure, pneumatic tubes stripped down over the valve shell, convoluted washers interposed between the tubes having their ridged surfaces in contact, intermediate grooves therein to form air passages extending from the ports of the valve shell to air spaces between the tubes, said air passages being adapted to register with the lateral ports of the tubular valve shell, lateral ports through the valve shell and valve stem adapted to be aligned with each other, and clamping means to hold the convoluted washers and pneumatic tubes combined in position against the conical section of the valve shell.

5. A hollow valve body of variable tubular diameters, a hollow valve stem of variable cylindrical diameters adapted to engage the hollow valve body forming a leak tight joint therewith, a check valve to control fluid pressure entered in the larger cylindrical socket of the valve stem, a single vent leading from the air-chamber containing the check valve to a pneumatic tube, and means for clamping the pneumatic tube on the valve body.

6. A hollow valve body, a hollow valve stem, both of relatively large and small bore, telescopically arranged, seats formed in the body of the valve stem at the junction of the reduced bore for a check valve, a check valve to control fluid pressure therein, pneumatic tubes so disposed on the valve body as to form interspaces therebetween, lateral vents for fluid pressure through the valve members leading to such interspaces and clamping means combining the pneumatic tubes and valve body together.

7. In a valve a valve shell, pneumatic tubes secured thereto, a hollow valve stem engaging the valve shell, double seats for a check valve formed in the hollow valve stem in spaced relation with each other, valve members therein connected by a valve rod and a spiral elastic spring compressed between the lower valve member and a plug entered in the valve stem to hold the valve members against their seats.

8. In a valve a valve shell, pneumatic tubes secured thereon, a hollow valve stem engaging the valve shell and adapted to receive a check valve, double seats for a check valve formed in the hollow valve stem and spaced apart, valve members therein properly adjusted to their respective seats, a helical valve rod connecting the valve members to admit of variable tension of the bearings against their seats and an elastic spiral spring compressed between the lower valve member and a plug entered in the valve stem.

9. In combination a hollow valve shell having an outer threaded portion integral with an inner conical portion offset therefrom with an annular flanged base extending radially thereon, pneumatic tubes clamped on the conical portion of the valve shell against the flanged base, air spaces for fluid pressure therebetween, vents through the clamping means leading to transverse ports through the valve shell, the hollow valve shell having an internally threaded socket to receive a hollow valve stem, a hollow valve stem engaging the internal threads of the socket of the valve shell air-tight to form a stop valve therewith, transverse ports through the body of the hollow valve shell, and transverse ports through the body of the hollow valve stem adapted to be adjusted in and out of alignment with the respective ports of the valve shell.

10. In a valve shell pneumatic tubes firmly secured thereto, interspaces for fluid pressure therebetween fluid pressure in the interspaces the valve shell having a socket to receive an adjustable stop-valve, an adjustable stop-valve engaging the hollow socket of the valve shell forming a leak tight joint therewith and concentrically disposed thereto, a check valve proper secured in the stop-valve, transverse ports through the valve shell and transverse ports through the stop-valve leading to interspaces between the tubes adapted to be adjusted against the inlet and outflow of air.

11. In combination a valve shell, double pneumatic tubes secured thereon in spaced relation with each other, an adjustable stop valve engaging the valve shell and housing a check valve therein and transverse ports through the valve shell and stop-valve normally aligned to admit fluid pressure to the interspaces between the tubes.

12. In combination a valve shell, double tubes secured thereon in spaced relation with each other, an adjustable stop-valve engaging the valve shell and housing a check valve therein an alternating transverse ports through the stop valve adapted to admit fluid pressure to the air space of the outer tube and to cut-off fluid pressure to the air space of the inner tube.

13. A plurality of pneumatic tubes spaced apart by convoluted washers providing air passages communicating with a fluid pressure space a hollow valve shell, means for clamping a plurality of pneumatic tubes serially thereon, a plurality of alternating transverse ports through the valve shell, a hollow stop valve adapted to receive a check valve, a plurality of alternating transverse ports through a stop valve, one of said ports adjustably registering alternately and consecutively with the ports of the valve shell and a compound check valve secured in the stop valve.

14. In combination a valve shell, triple pneumatic tubes concentrically disposed to each other, spaced apart and clamped thereon, a stop valve engaging the valve shell, a check valve housed in the stop valve and triple ports through the valve shell and stop valve registering with each other and leading to interspaces between the tubes.

15. In combination a valve shell, triple tubes spaced apart and clamped therto, a stop valve engaging the valve shell and housing a compound check valve, a compound check valve secured in the stop valve, transverse alternating ports through the valve shell, and transverse alternating ports through the stop valve adapted to be adjusted to register with ports of the valve shell leading to interpsaces of the two outer tubes and closing the ports to the inner tube.

16. In combination a valve shell, triple tubes spaced apart and clamped thereon, a stop valve entered in the valve shell and receiving a check valve, a check valve secured in the stop valve to control fluid pressure, transverse alternating ports through the valve shell in alignment with interspaces between the tubes and transverse alternating ports through the stop valve normally aligned to register ports leading to interspaces of the two inner tubes and closing the ports to the outer tube.

17. In combination triple tubes spaced apart and clamped to a valve shell, a stop valve entered therein, a back check housed in the stop valve controlling fluid pressure, transverse alternating ports through the valve shell leading to interspaces between the tubes and transverse alternating ports in the stop valve adapted to register one of its ports alternately and consecutively with one of the ports of the valve shell.

18. In a valve a compound check comprising double valve bearing members arranged in couplets along the valve rod, a hollow valve stem adapted to receive the compound check valve, seats provided in the body of the hollow valve stem for the valve bearing members, each of the valve bearing members comprising a cup beveled out with a smooth uniform annular rim and a wedged-shaped central core, flexible gaskets interposed between the valve bearings and the valve seats, a plug in the valve shell limiting an elastic spiral spring and an elastic spiral spring compressed between the plug and the lower valve member to hold the valves against their seats.

19. In combination a hollow valve shell having an outer threaded portion integral with an inner conical portion offset therefrom with an annular flanged base extending radially thereon, pneumatic tubes clamped on the conical portion of the valve shell against the flanged base, a valve stem engaging the valve shell, a check valve housed therein, a plug entered in the valve stem and an elastic spiral spring compressed between the under side of the valve member and the plugged end of the valve stem to increase the tension of the bearings of the valves against the seats.

20. In combination a valve shell, pneumatic tubes rigidly clamped thereon independently of each other providing an overlap along the valve shell, lateral ports through the valve shell leading to interspaces between the tubes normally covered by the overlap of the tubes, means admitting fluid pressure through the ports of the valve shell between the tubes and the freely moveable overlap of the tubes held along the body of the valve shell by the fluid pressure serving as a check valve against the outflow of air.

JACOB ALPHEUS OVERLANDER.

Witnesses:
WOLF RATSHIN,
WILLIAM I. HURLEY.